United States Patent
Zhou et al.

(10) Patent No.: US 9,706,550 B1
(45) Date of Patent: Jul. 11, 2017

(54) SYSTEMS AND METHODS FOR ALLOCATING RESOURCES USING ENHANCED SEMI-PERSISTENT SCHEDULING IN A WIRELESS NETWORK

(71) Applicant: Sprint Spectrum LP, Overland Park, KS (US)

(72) Inventors: Yu Zhou, Herndon, VA (US); Muhammad Ahsan Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 242 days.

(21) Appl. No.: 14/499,360

(22) Filed: Sep. 29, 2014

(51) Int. Cl.
*H04W 4/00* (2009.01)
*H04W 72/04* (2009.01)
(52) U.S. Cl.
CPC ............................. *H04W 72/0446* (2013.01)
(58) Field of Classification Search
CPC ................................................ H04W 72/0446
See application file for complete search history.

(56) References Cited

U.S. PATENT DOCUMENTS

| | | | |
|---|---|---|---|
| 8,160,014 B2 | 4/2012 | Ojala et al. | |
| 2010/0284364 A1 | 11/2010 | You et al. | |
| 2011/0292895 A1* | 12/2011 | Wager | H04L 5/0007 370/329 |
| 2013/0083702 A1 | 4/2013 | Barany et al. | |
| 2013/0294247 A1* | 11/2013 | Zhu | H04W 72/0486 370/235 |
| 2014/0094159 A1* | 4/2014 | Raleigh | H04W 24/02 455/418 |

* cited by examiner

*Primary Examiner* — Ayaz Sheikh
*Assistant Examiner* — Hai-Chang Hsiung (57) ABSTRACT

Systems and methods are described for allocating resources using enhanced semi-persistent scheduling (SPS) in a wireless network. A plurality of wireless devices may be in wireless communication with an access node. Based on application requirements of the wireless devices, the access node may allocate dedicated resource slots on a persistent schedule for each wireless device requesting SPS services. The wireless devices having the SPS allocations of dedicated resource slots are monitored at intervals for changes in amount of resource usage above or below the size of the dedicated resource slot for each wireless device. If a data transmission for a wireless device exceeds the dedicated resource slot allocated to that wireless device, then the transmission may be truncated, with a first portion being transmitted in the dedicated resource slot and a second portion being transmitted in one or more non-dedicated resource slots.

16 Claims, 6 Drawing Sheets

SYSTEMS AND METHODS FOR ALLOCATING RESOURCES USING ENHANCED SEMI-PERSISTENT SCHEDULING IN A WIRELESS NETWORK

TECHNICAL BACKGROUND

Wireless network resources may include multiple slots within a frame for information related to voice or data signals. A frame may be defined by time and frequency, and slots may be located at particular times and frequencies established by an access node or other network node assigning signals to the slots. Various frames or slots within frames may be dedicated to control signals to establish or maintain wireless communication, or intended for bearing data of an application on one or more wireless devices. Control signaling may be minimized by establishing a schedule of anticipated data bearing signals over time.

One type of loading on a wireless network may be related to a number of slots dedicated to wireless communication in one or more frames. The number of slots or frames available within a given time period for an access node depends upon bandwidth of the access node. An amount of slots dedicated to a control signal and a data bearing signal may be based on application requirements for each of the one or more wireless devices and may be measured by an amount of resources (e.g. slots), which in one example may be measured as physical resource blocks (PRBs). As available resources for each access node are limited, it may be desirable to reduce overhead of control signals by using a persistent or semi-persistent schedule of dedicated resources and to increase capacity of network by providing appropriate amounts of dedicated resource slots, which in an exemplary embodiment may be measured as an amount of PRBs anticipated to be used for each iteration of the persistent or semi-persistent schedule.

Overview

In an embodiment, the method for allocating resources in an access node may include the following. The access node may determine an application requirement for a wireless device and allocate a dedicated resource slot for the wireless device for periodic transmission of a particular size and rate of occurrence. The access node may also allocate non-dedicated resource slots which may be used for data from the wireless device when the dedicated resource slot is insufficient to carry all of the voice or data signal provided during a particular transmission iteration.

The access node may receive data packets for delivery to or from the wireless device. Certain applications such as VoIP or VoLTE, require bidirectional data transmission, but may emphasize one or the other at a particular time, depending on who is sending a signal (i.e. talking or otherwise making noise about a threshold) at a given time. As packet size may vary, it may be desirable for the access node to compare a size of each received data packet with a size of the dedicated resource slot allocated to that wireless device during the particular transmission iteration.

When the size of a received data packet exceeds the size of the dedicated resource slot for that iteration, the received data packet may be truncated to allow some of the received data packet to be transmitted in the dedicated resource slot. The rest of the truncated data packet may be transmitted in one or more non-dedicated resource slots that occur before the next anticipated transmission iteration. The wireless device or other network node may retrieve all portions of the truncated data packet by looking in the dedicated resource slot as well as each non-dedicated slot when it is determined that the size of the data packet exceeded the dedicated resource slot.

DETAILED DESCRIPTION

Figure 1:
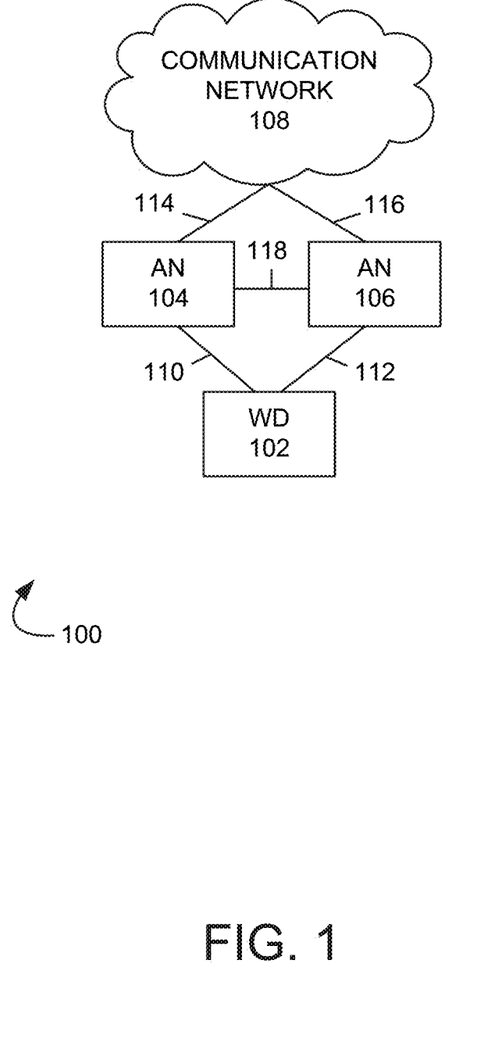
FIG. 1 illustrates an exemplary communication system used to allocate resources using enhanced semi-persistent scheduling of wireless transmissions.

FIG. 1 illustrates an exemplary communication system 100 to determine an access node for a wireless device comprising wireless device 102, access nodes 104 and 106, communication network 108, and communication links 110, 112, 114, and 116. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented. In particular for the present teachings, two or more wireless devices similar to wireless device 102 may share resources in one or more non-dedicated resource slots within one or more of the same access nodes similar to access nodes 104 and 106, or other nodes within communication network 108 configured to communicate using the enhanced SPS protocols in accordance with the present teachings.

Access nodes 104 and 106 are network nodes capable of providing wireless communications to wireless device 102, and can be, for example, a base transceiver station, a radio base station, a NodeB device, or an eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102.

Although only two access nodes 104 and 106 are illustrated in FIG. 1, wireless device 102 can be in communication with a plurality of access nodes. The plurality of access nodes can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or other types of communication equipment, as well as combinations thereof.

Communication links 110, 112, 114, 116, and 118 can be wired or wireless communication links. Wired communication links can comprise, for example, twisted pair cable, coaxial cable, or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, WiMAX, or 3GPP LTE, or combinations thereof. Other wireless protocols can also be used.

Figure 2A:
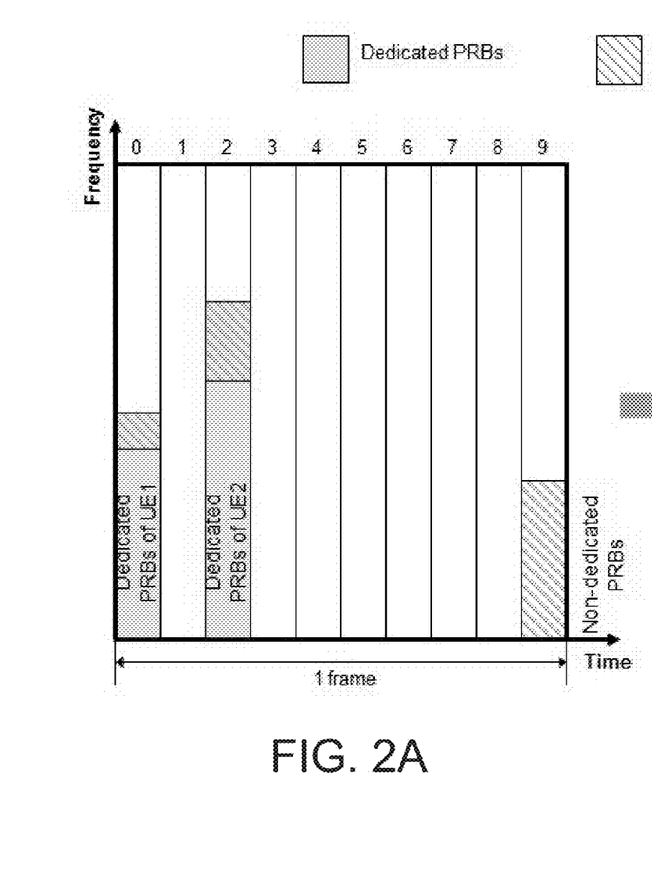
FIGS. 2A and 2B illustrate exemplary frames in which resource slots are allocated in dedicated and non-dedicated resource slots.
Figure 2B:
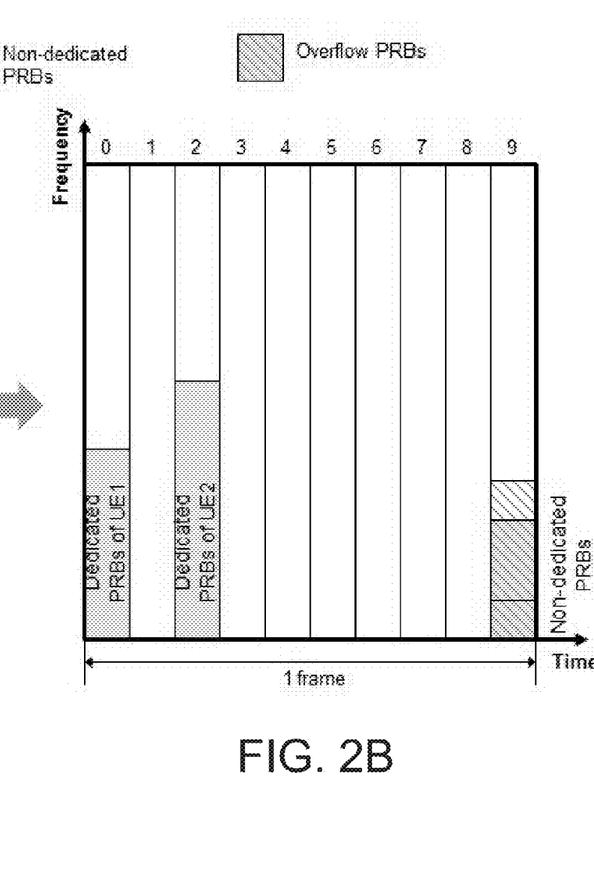

FIGS. 2A and 2B illustrate exemplary frames having resource slots in which resources may be allocated based on time and frequency of signal transmission. The signals may be scheduled semi-persistently, in that they occur in a repeated manner, such that transmission iterations may be anticipated at a regular schedule and within one or more predetermined frequency bands or channels. The schedule and predetermined frequencies may be communicated between the wireless devices and the access node only upon changes in anticipated usage conditions, otherwise the access node will allocate the amount of dedicated resource slots illustrated in FIGS. 2A and 2B. In an embodiment, the resource slots are physical resource blocks (PRBs).

When a wireless device initially communicates with the access node, the wireless device may provide information regarding an anticipated demand for semi-persistent resources. The demand for resources may be semi-persistent when signals are anticipated to be transmitted at regular, periodic intervals during active periods; however, the signal may not be entirely persistent, because there may be passive periods in which little or no voice or data signal is transmitted, as may be the case during a period of silence during an analog voice, a Voice-over-Internet-Protocol (VoIP) or a Voice-over-LTE (VoLTE) call.

The initial communication between a wireless device and an access node may include information regarding a persistently scheduled slot for voice or data signal. Establishing the semi-persistent schedule (SPS) may eliminate a significant amount of data from having to be transmitted through control channels, since slots are allocated persistently (or at least SPS), so control signals need to be transmitted. The slots that are scheduled persistently or semi-persistently to a particular wireless device become the dedicated slots for that wireless device. In order to narrowly tailor the size of the dedicated slots, it may be desirable to include non-dedicated slots within each frame as overflow for data packets transmitted in excess of their assigned dedicated slot.

As noted above, non-dedicated slots may allow the dedicated slots to be more narrowly tailored to the estimated demands of the semi-persistent schedule, whereas a conventional approach may be more conservative and may set aside more resources than necessary for each dedicated slot to act as a buffer or safety margin. If packet sizes change during transmission, for example due to changed compression header size, then the size of the enhanced semi-persistently scheduled slot may be adjusted to decrease the size of the dedicated slot and thereby free up resources to be used by other wireless devices according to the presently disclosed subject matter. The change may be initiated by the access node or network node upon determination that an amount of used slot space over one or more frames exceeded or fell short of dedicated slot space by threshold amounts. Various thresholds may be established such that the change may be made with precision and can distinguish between reduction in control signaling and reduction in data signaling, for example during a period of silence during a VoIP or VoLTE call. An amount of dedicated resource slots for each wireless device may also be increased when an amount of transmitted data exceeds a threshold or exceeds the amount of dedicated resources slots in one or more transmission iterations due to changed application requirements or network conditions that require additional control signals or header size.

Once wireless communication is established between a wireless device and an access node, the wireless device may transmit a request for periodic transmissions having a determined pattern and size, rather than a separate request for each transmission. Based on the received request, the access node may allocate resources and information may be transmitted between the access node and the wireless device according to the schedule of allocated resources. If the amount of a data packet to be transmitted or received by the wireless device is larger than an amount of dedicated resources during the time period of transmission, then the data packet may be truncated at the size of the dedicated resource slot and the remainder of the truncated data packet may be transmitted in one or more non-dedicated resource slots to be used by any or all wireless devices.

It may also be desirable to alter the periodicity of voice or data signal transmission as opposed to a slot size when changing a semi-persistent schedule. During a silence period of a voice call, it may be possible to both decrease a slot size in terms of channel width, but also to decrease a rate of signal transmission by half, or such amounts as may be particularly suited to the determined application requirements.

All wireless devices or other network nodes communicating with the same access node using the semi-persistent scheduling may be provided with the pattern and modulation of non-dedicated resource slots which may be used to transmit portions of truncated data packets intended for retrieval by the wireless devices or other network nodes. The truncated data packet may have a header containing identifying information about the data transmission in the non-dedicated resource slot, including intended target (i.e. wireless device or other network node), and the intended target may be provided with identifying information to find and decode packets in the non-dedicated resource slots. In this way, packets intended for multiple wireless devices may be included in any order within the non-dedicated resource slots and accessed by each wireless device using persistent or SPS services, however only the intended target for the data transmission may decode the data. In an exemplary embodiment, decoding information is a temporary identifier such as a Cell Radio Network Temporary Identifier (CRNTI). The intended target may use the CRNTI to decode only the portion of the non-dedicated slots containing the truncated data intended for that target, whereupon the wireless device or other network node may discard all other data in the non-dedicated resource slot.

In one embodiment, a pattern of non-dedicated resource slots may include the last subframe of each frame, to allow for transmission of truncated data packets prior to the next anticipated transmission iteration. If a data packet is truncated, the wireless devices or other network nodes may determine that the truncated data packet does not contain all of the voice or data signal intended for the wireless device or network node during that transmission iteration. This may trigger the wireless device or network node to determine whether any of the data packets located in the non-dedicated slots are intended for that wireless device or network node. When the voice or data signal is transmitted in the manner described above, it may be possible to reduce latency while improving efficient allocation of resources by decreasing a volume of control signals and increasing flexibility of the allocation schedule through analysis of the amount of dedicated slot space used over time and adjusting size and timing of slots based on that analysis. By suspending or pausing semi-persistently scheduled allocations during periods of little or no voice or data signal, resources may become available to other wireless devices or network nodes. However, if more signal data is received than the size of the dedicated slot over multiple transmission iterations, then it may be desirable to increase the dedicated slot size to allow transmission of other data in non-dedicated slots.

The system used to allocate the resources in dedicated and non-dedicated slots indicated in FIGS. 2A and 2B comprises at least two wireless devices connecting to one or more access nodes which may be similar to the configuration of FIG. 1. Although the graphs illustrate two devices, it is within the scope of the present teachings to have a single wireless device. Also, while this embodiment is described for use with an access node, the present teachings also contemplate communication of SPS allocations among additional network nodes to facilitate a connection to the desired destination.

In the exemplary embodiment, FIG. 2A illustrates that the access node allocates a dedicated resource slot to each wireless device requesting SPS allocation, and in this embodiment, the dedicated resources slots of the wireless devices are referred to as Dedicated PRBs of UE1, UE2. FIG. 2A also includes portions having shading and hash marks that are overflowing the size of the dedicated resource slot. Rather than transmit the overflow PRBs illustrated in FIG. 2A within the next frame, it is contemplated that the whole of the data packet transmission may be truncated into the size of the dedicated resource slot and a remaining portion of the truncated data packet that may be transmitted in resource slots that are non-dedicated, in that these non-dedicated resource slots may be used by signals received by or intended for a plurality of wireless devices.

In an embodiment, when the size of the data packets for UE1 and U2 both exceed the amount of dedicated resource slots as described and illustrated in FIG. 2A, the data packets may be truncated and a portion of each wireless device's data packets transmitted with the non-dedicated resource slots as illustrated in FIG. 2B with shading and hash marks. While the frame only includes the one allocation of non-dedicated resource slots in FIG. 2A, there may be additional slots provided in a pattern of resources.

In an embodiment, access nodes may be identified by any wireless device in range of the access nodes. The access nodes may be identified by information such as physical cell identifiers (PCI), cell global identifications (CGI), E-UTRAN cell identifiers (ECI), E-UTRAN cell global identifiers (ECGI), eNodeB identifiers (eNB-ID), or the like. The wireless device may determine the signal levels for identified access nodes, as well as the frequency band of each cell of the access nodes. Access nodes may also provide connection information (e.g., X2 connection information), handover information, and other relevant neighbor information to determine if there are cells in the same or different frequency bands nearby.

Figure 3:
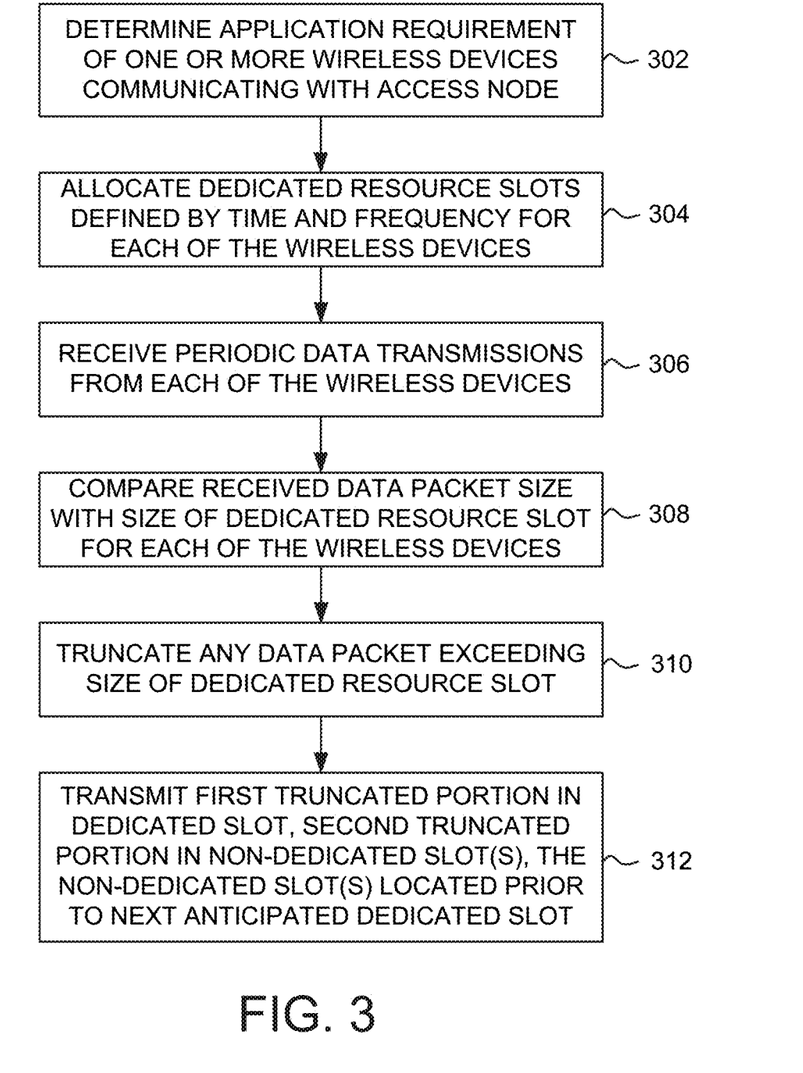
FIG. 3 illustrates an exemplary method of allocating resources using enhanced semi-persistent scheduling in a wireless network.

FIG. 3 illustrates an exemplary method for allocating resources using enhanced semi-persistent scheduling in a wireless network. The method will be discussed with reference to the exemplary communication system 100 of FIG. 1 as shown in use in the illustration of resource allocation in FIG. 2. However, the method can be implemented with any suitable communication system.

Referring to FIG. 3, at step 302, an access node or other network node may determine an application requirement of one or more wireless devices that are each in wireless communication with a particular access node. The application requirements may relate to a request for SPS allocation of resources for services that are anticipated to occur on a regular schedule with periods of more or less transmissions. In one exemplary embodiment, one or more of the wireless devices in wireless communication with the particular access node request VoIP or VoLTE services comprising persistent scheduling along with anticipated periods of silence or increased activity in which an amount of data to be transmitted is less or more than the amount of services initially requested.

In order to avoid sending overflowing data in a subsequent frame, it may be desirable to provide slots to accommodate the overflowing amounts. Such provision may avoid unnecessary delays in data transmission that can negatively impact a quality of service as related to application requirements and a user experience. However, if a size of slots is too large over a period of time, it may be desirable to decrease the size of slots in order to make more resources available to additional wireless devices.

At step 304, the particular access node may allocate dedicated resource slots for each of the wireless devices requesting a type of service, as indicated by the application requirements of each wireless device. The dedicated resource slots may be defined by time and frequency within one or more frames used for the transmission of data packets. In the illustrated embodiment of FIGS. 2A and 2B, the teachings refer to a single frame, but it is within the scope of the teachings to also have a plurality of frames.

Thus, in a merely exemplary embodiment, two devices may have dedicated resource slots allocated in the same frame for the access node, wherein the slots of the frame are defined by time and frequency.

At step 306, each of the wireless devices periodically communicates with the access node, and so the access node receives periodic data transmissions from each of the wireless devices and also receives periodic data transmissions intended for each of the wireless devices.

At step 308, an access node may determine a data packet size of each data transmission and compare that size to the size of the dedicated resource slot intended for use by each wireless device. The comparison may include an analysis of a number of physical resource blocks (PRBs) or other similar metric of resource allocation.

At step 310, any data transmission having a greater size than the dedicated resource slot allocated for a particular wireless device may have overflowing data packets truncated. The truncation of data packets may be at a point where the data transmission begins to overflow the size of the dedicated resource slot. However, it is also within the scope of the present teachings to truncate a data transmission at another suitable point.

At step 312, the access node may transmit data packets including a first truncated portion of the data transmission in the dedicated resource slot for the particular wireless device and a second truncated portion in one or more non-dedicated resource slots scheduled before the next anticipated iteration of voice or data signal transmission.

A pattern of dedicated and non-dedicated slots may be located within a single frame in order to transmit truncated data packets prior to the next SPS dedicated slot, which may occur in the next frame. Multiple non-dedicated slots may be located in the pattern to allow more flexibility in slot size or timing. It may also be desirable to locate non-dedicated resource slots as late as possible within a frame or subframe to ensure that truncated packets are transmitted in a non-dedicated slot that occurs before the next iteration of the dedicated resource slot.

Figure 4:
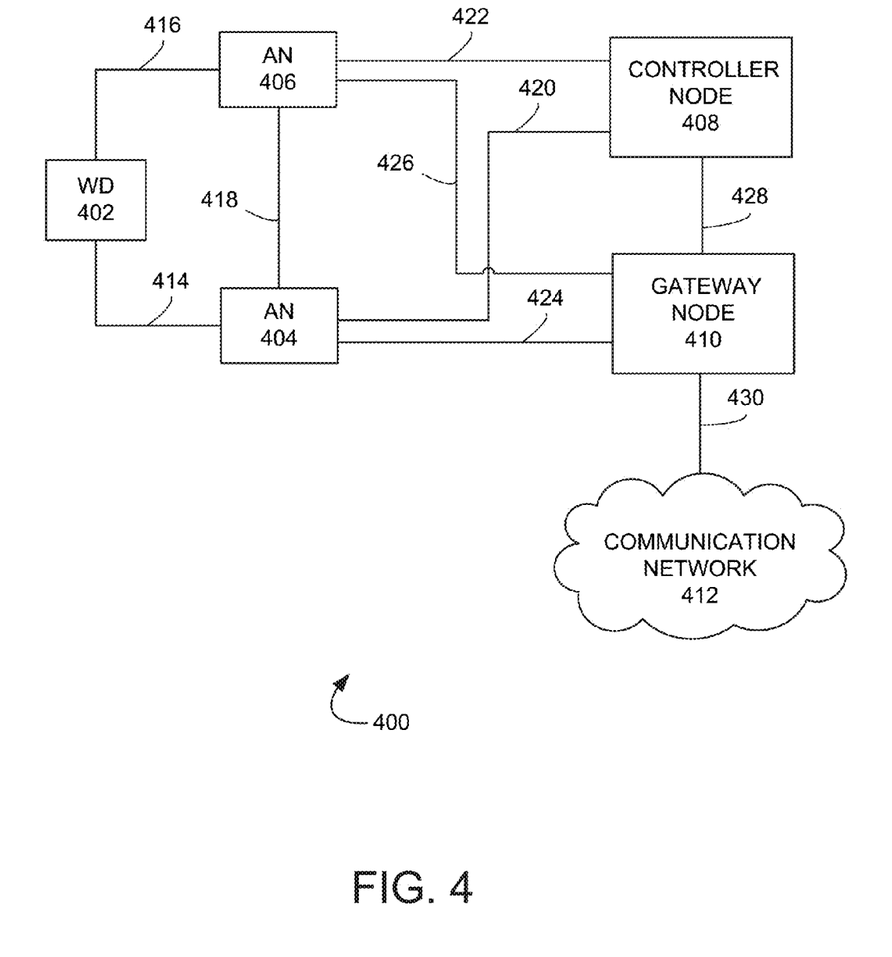
FIG. 4 illustrates another exemplary system used to allocate resources using enhanced semi-persistent scheduling of wireless transmissions.

FIG. 4 illustrates another exemplary communication system 400 that may be used to allocate resources in a wireless network. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, a NodeB device, or an enhanced NodeB (eNodeB) device. In an embodiment, access node 404 can comprise a serving access node for wireless device 402. Access nodes 404 and 406 may communicate with controller node 408 over communication links 420 and 422, and with gateway node 410 over communication links 424 and 426.

Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and combinations thereof. In an embodiment, controller node 408 may perform portions of the steps illustrated in the methods of FIGS. 3 and 5.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and combinations thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet).

Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
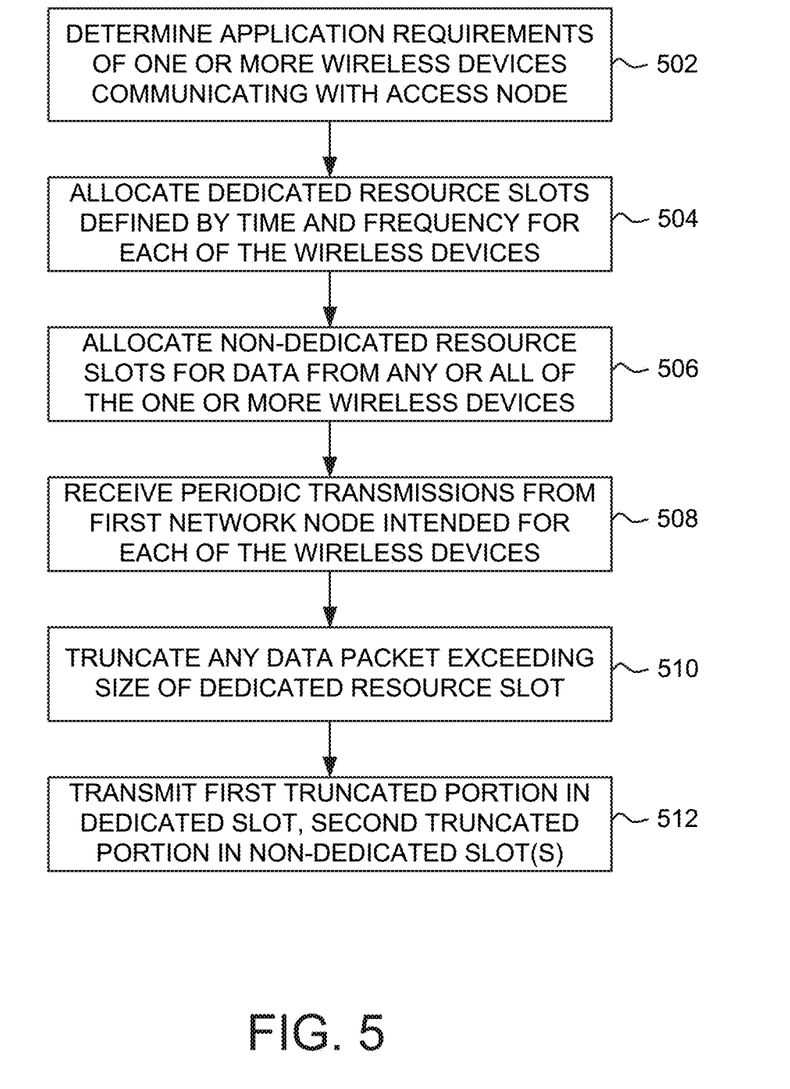
FIG. 5 illustrates another exemplary method used of allocating resources using enhanced semi-persistent scheduling in a wireless network.

FIG. 5 illustrates an exemplary method for allocating resources using enhanced semi-persistent scheduling in a wireless network. The method will be discussed with reference to the exemplary communication system 400 illustrated in FIG. 4, however, the method can be implemented with any suitable communication system.

Referring to FIG. 5, at step 502, one or both of access nodes 404 and 406 may determine application requirements for wireless device 402. The application requirements may relate to a request for SPS allocation of resources for services that are anticipated to occur on a regular schedule with periods of more or less transmissions. In one exemplary embodiment, one or more of the wireless devices in wireless communication with the particular access node request VoIP or VoLTE services comprising persistent scheduling along with anticipated periods of silence or increased activity in which an amount of signal to be transmitted is less or more than the amount of services initially requested.

At step 504, each access node of access nodes 404 and 406 in wireless communication with wireless device 402, and having sufficient resources, may allocate data to dedicated resource slots for wireless device 402 based on determined application requirements. The dedicated resource slots may be defined by time and frequency within one or more frames used for the transmission of data packets. The allocation of dedicated resource slots may occur on a periodic basis with monitoring at regular intervals.

At step 506, access nodes 404 and/or 406 may allocate non-dedicated resource slots for devices having similar application requirements to wireless device 402. The non-dedicated resource slots may be used for overflow data packets transmitted to or from wireless device, or other wireless devices having an application suitable for SPS.

At step 508, wireless device 402 periodically communicates with either or both of access nodes 404 and 406, and the communicating access nodes receive periodic data transmissions intended to be transmitted to or received from wireless device 402. In an exemplary embodiment, the periodic communication is transmitted during a phone call for which wireless device 402 has requested VoIP or VoLTE services. During such calls, it is typical for packet sizes to be transmitted regularly during talk periods, punctuated by periods in which no data packets are transmitted due to user silence while listening to the other user(s) talk. In other examples, data packet sizes may vary in size due to data header compression by protocols such as Robust Header Compression (RoHC).

In an embodiment, data packets transmitted in a VoIP data transmission may have different header compression states at different times. The RoHC protocol may be implemented with IP, UDP, UDP-Lite, RTP, and TCP headers of data packets such as those transmitted during VoIP. Once a particular wireless device has an established SPS allocation with an access node, it may be possible to compress the header information by synchronization of a compressor and decompressor on sending and receiving ends.

In an exemplary embodiment, there may be an Initialization and Refresh (IR) state, a First Order (FO) state, and a Second Order (SO) state, listed in decreasing header size due to first and second order compression. A size of the header may vary greatly between the IR state and the SO state, and thus the amount of resources used by a wireless device may decrease in steps once the FO and SO states are achieved. It may be desirable to change to a lower compression state if network conditions have changed in order to ensure that the decompressor is able to correctly identify the source of data.

At step 510, either of access nodes 404 and 406 may determine a size of data packet transmission for data transmitted to or from wireless device 402. The access node having an SPS allocation for wireless device 402 may compare the size of the data packet transmission to the size of the dedicated resource slot intended for use by wireless device 402. The comparison may include an analysis of a number of physical resource blocks (PRBs) or other similar metric of resource allocation.

At step 512, if data transmitted to or from wireless device 402 is larger than the size of the dedicated resource slot for wireless device 402, access node 404 or 406 may truncate the overflowing data transmission. The truncation of data packets may be at a point where the data transmission begins to overflow the size of the dedicated resource slot. However, it is also within the scope of the present teachings to truncate a data transmission at another suitable point.

At step 514, access node 404 or 406 may transmit data packets including a first truncated portion of the data transmission in the dedicated resource slot for wireless device 402 and a second truncated portion in one or more non-dedicated resource slots scheduled before the next anticipated iteration of data transmission. As noted above, the non-dedicated resource slots may also be used for data transmissions to or from other wireless devices. There may also be multiple dedicated resource slots, as in FIG. 2.

The pattern of non-dedicated slots may be provided to each device, but may be read only by an intended device based on identifying information transmitted along with the truncated data packets. A wireless device or other network node may be able to determine if a size of packets to be transmitted in a frame exceeds a corresponding amount of dedicated resource slots for the particular wireless device or network node. Upon determining that there are packets in excess of the dedicated resource slot for a frame, a wireless device may receive all of the data packets transmitted within all of the non-dedicated slots of the same frame. While the pattern of non-dedicated slots and truncated data packets are received by all of the wireless devices, each wireless device is only able to decode data packets intended for it by using information received by the wireless device, for example within a control signal transmitted by the access node. Thus, all of the wireless devices have access to and may receive all non-dedicated PRBs, but each wireless device has a unique code to find and decode its intended data packets.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
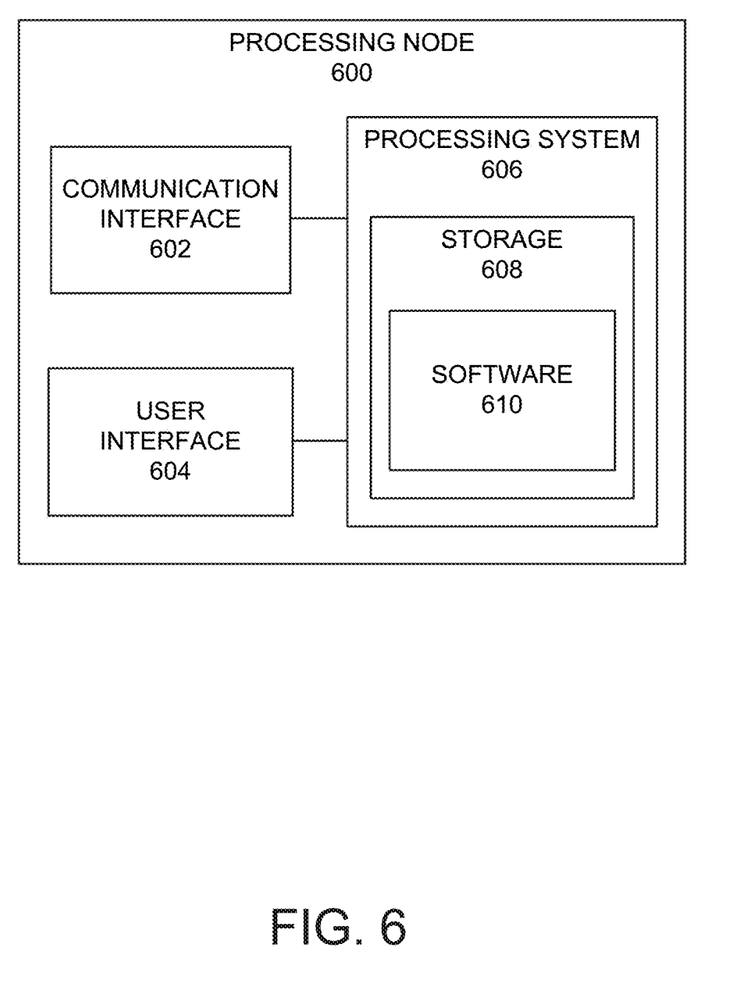
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408 and gateway node 410. Processing node 600 can also be an adjunct or component of a network element, such as an element of access nodes 104, 106, 404, or 406. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion.

The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for allocating resources in an access node in communication with a wireless network, the method comprising:
   determining by the access node application requirements for a first wireless device in wireless communication with the access node;
   allocating by the access node a dedicated resource slot within a frame defined by frequency and time, the dedicated resource slot having a size and periodicity for the first wireless device, wherein the allocation of the dedicated resource slot is based on the determined application requirements for the first wireless device,
   allocating by the access node non-dedicated resource slots within a portion of the frame comprising the dedicated resource slot, the non-dedicated resource slots to be used for data from the first wireless device or data from one or more others of a plurality of wireless devices in wireless communication with the access node;
   receiving by the access node data packets for transmission to or from the first wireless device;
   comparing a size of each received data packet with the size of the dedicated resource slot allocated for the first wireless device during a period of comparison;
   truncating any received data packet for which the size of the received data packet exceeds the size of the dedicated resource slot allocated for data to or from the first wireless device;
   transmitting a first portion of each truncated data packet in the dedicated resource slot for the first wireless device and at least one second portion of each truncated data packet in one or more non-dedicated resource slots transmitted before a subsequent dedicated resource slot allocated for data to or from the first wireless device;
   monitoring the application requirements for the first wireless device in periods of comparison to determine a size of the dedicated resource slot for the first wireless device; and
   adjusting a size of the dedicated resource slot for the first wireless device based on the comparison with received data packet size indicating a variation in data packet size above a threshold variation level for a time exceeding a threshold period of time,
   wherein the variation in data packet size is due to a change in a compression state of a data header between received data packets.

2. The method of claim 1, wherein the application requirements comprises a semi-persistently scheduled (SPS) service having spurt periods of activity and passivity.

3. The method of claim 2, wherein the application requirements further comprise at least one of a service class identifier, a minimum guaranteed bit rate, a maximum bit rate, a minimum bit rate, a maximum permitted data delay, a minimum throughput, a maximum error rate, or a maximum data loss rate.

4. The method of claim 1, further comprising:
configuring a pattern of non-dedicated resource slots that does not overlap with a pattern of dedicated resource slots positioned within the frame; and
providing the pattern of non-dedicated resources to each of the one or more wireless devices or network nodes to which each truncated data packet is transmitted.

5. The method of claim 4, wherein the one or more network nodes comprise at least one of a different wireless device with which the access node is in wireless communication, a controller node, or a further access node.

6. The method of claim 4, further comprising:
receiving by the access node transmissions of data packets from the one or more network nodes;
providing the pattern of non-dedicated resource slots to each of the one or more wireless devices in wireless communication with the access node; and
transmitting by the access node the data packets from the one or more network nodes to an intended wireless device from the one or more wireless devices in wireless communication with the access node, wherein one or more of the network node data packets is transmitted as a truncated data packet having a first portion located in the dedicated resource slot for the intended wireless device and at least one second portion located in one or more non-dedicated resource slots within the same frame.

7. The method of claim 6, further comprising:
modulating each truncated data packet located in a non-dedicated resource slot intended for the first wireless device such that the modulated data packet is identified and decoded by the first wireless device.

8. The method of claim 7, further comprising:
providing a notification with the first portion of the truncated data packet that the at least one second portion is being transmitted in the non-dedicated resource slots.

9. A system for allocating resources in a wireless network, comprising:
an access node configured to:
determine an application requirement for one or more wireless devices in wireless communication with the access node;
allocate a dedicated resource slot for each of the one or more wireless devices within a frame defined by frequency and time, wherein allocation of a dedicated resource slot is based on the determined application requirement for each of the one or more wireless devices;
allocate non-dedicated resource slots within a portion of the frame comprising the dedicated resource slot, the non-dedicated resource slots shared by all of the one or more wireless devices;
receive periodic transmissions of data packets from each of the one or more wireless devices;
compare a size of each received data packet with a size of the dedicated resource slot allocated for each of the one or more wireless devices;
truncate any received data packet for which the size of the received data packet exceeds the size of the dedicated resource slot allocated for a respective wireless device;
transmit to one or more network nodes a first portion of each truncated data packet in the dedicated resource slot for the respective wireless device and at least one second portion of each truncated data packet in at least one of the non-dedicated resource slots that are located prior in time to an expected timing for a proximal occurrence of the dedicated resource slot for the respective wireless device; and
adjust an amount of dedicated uplink resources for each of the one or more wireless devices based on the comparison with received data packet size indicating a variation in data packet size above a threshold variation level for a time exceeding a threshold period of time,
wherein the variation in data packet size is due to a change in a compression state of a data header between received data packets.

10. The system of claim 9, wherein the application requirement comprises a periodicity and a size of the periodic data transmissions.

11. The system of claim 10, wherein the application requirement further comprises at least one of a service class identifier, a minimum guaranteed bit rate, a maximum bit rate, a minimum bit rate, a maximum permitted data delay, a minimum throughput, a maximum error rate, or a maximum data loss rate.

12. The system of claim 9, wherein the access node is further configured to:
configure a pattern of non-dedicated resource slots that does not overlap with a pattern of dedicated resource slots positioned within the frame; and
provide the pattern of non-dedicated resources to each of the one or more network nodes to which each truncated data packet is transmitted.

13. The system of claim 12, wherein the one or more network nodes comprise at least one of a different wireless device with which the access node is in wireless communication, a controller node, or a further access node.

14. The system of claim 12, wherein the access node is further configured to:
receive transmissions of data packets from the one or more network nodes;
provide the pattern of non-dedicated resource slots to each of the one or more wireless devices in wireless communication with the access node; and
transmit the data packets from the one or more network nodes to an intended wireless device from the one or more wireless devices in wireless communication with the access node, wherein one or more of the network node data packets is transmitted as a truncated data packet having a first portion located in the dedicated resource slot for the intended wireless device and at least one second portion located in one or more non-dedicated resource slots within the same frame.

15. The system of claim 14, wherein the access node is further configured to:
modulate each truncated data packet located in a non-dedicated resource slot such that the modulated data packet is identified and decoded by the intended wireless device.

16. A method of allocating resources in an access node, the method comprising:

determining by the access node application requirements for at least one wireless device;

allocating by the access node at least one dedicated resource slot within a timeframe for each of the at least one wireless devices, wherein the allocation of the dedicated resource slots is based on the determined application requirements for each at least one wireless device;

allocating by the access node one or more non-dedicated resource slots within the timeframe comprising the at least one dedicated resource slot, the one or more non-dedicated resource slots being used for data from a plurality of network nodes to the at least one wireless device;

receiving by the access node periodic transmissions of data packets intended for the at least one wireless device from a first network node from among the plurality of network nodes;

comparing a size of each received data packet with a size of the dedicated resource slot allocated for the at least one wireless device within the timeframe in which the data packet is received;

truncating any received data packet for which the size of the received data packet exceeds the size of the dedicated resource slot allocated for data to a respective wireless device;

transmitting a first portion of each truncated data packet in the dedicated resource slot for the respective wireless device and a second portion of each truncated data packet in the one or more non-dedicated resource slots;

monitoring the application requirements for the at least one wireless device in periods of comparison to determine a size of the dedicated resource slot for the at least one wireless device; and adjusting a size of the dedicated resource slots for the at least one wireless device based on the comparison with received data packet size indicating a variation in data packet size above a threshold variation level for a time exceeding a threshold period of time, wherein the variation in data packet size is due to a change in a compression state of a data header between received data packets.

* * * * *